(No Model.)
A. VREELAND.
VEHICLE WHEEL.
No. 284,990. Patented Sept. 11, 1883.
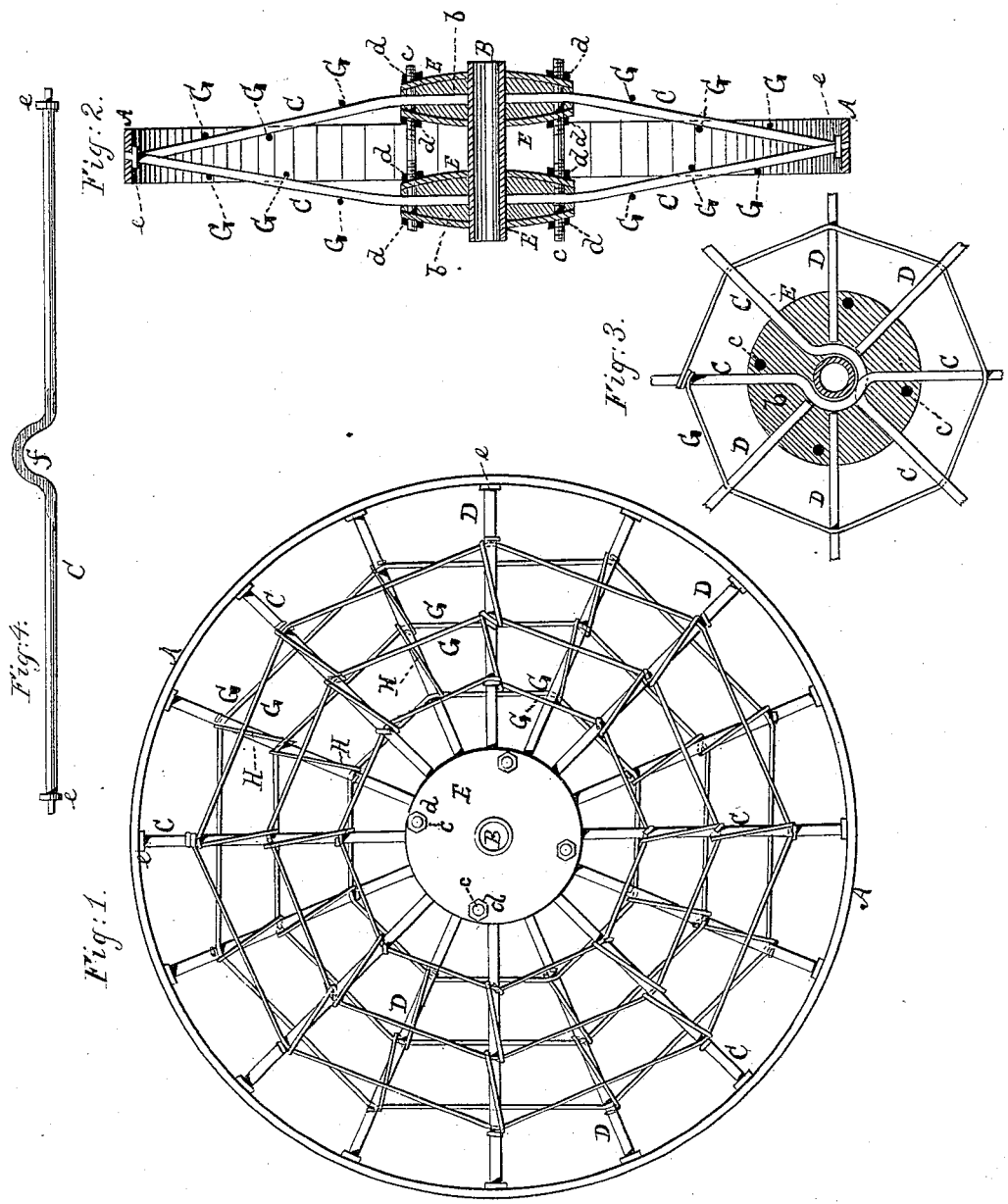
Witnesses:
John C. Tunbridge.
Charles A. Berri
Inventor:
Aaron Vreeland

UNITED STATES PATENT OFFICE.

AARON VREELAND, OF CEDAR GROVE, NEW JERSEY.

VEHICLE-WHEEL.

SPECIFICATION forming part of Letters Patent No. 284,990, dated September 11, 1883.

Application filed July 2, 1883. (No model.)

*To all whom it may concern:*

Be it known that I, AARON VREELAND, a citizen of the United States, residing at Cedar Grove, in the county of Essex and State of New Jersey, have invented certain new and useful Improvements in Vehicle-Wheels, of which the following is a specification.

My invention relates to improvements in wire wheels for vehicles, more particularly the large wheels of velocipedes; and the invention consists in certain constructions and combinations of parts whereby increased strength and lightness are combined with great elasticity, the same including a woven series of concentrically-arranged wires on both sides of the wheel which has light rod or stiff-wire spokes, and which, by the combination of the interwoven concentrially-arranged wires with the spokes, presents a screen-like appearance.

The invention also includes a peculiar construction and combination of the spokes, likewise an improved construction of the hub portion of the wheel, all as hereinafter fully described.

Figure 1 is a side view of the wheel. Fig. 2 is a central transverse section thereof, taken longitudinally through the axis of the wheel. Fig. 3 is a section of the central portion of one side of the wheel transversely to the axis thereof, showing a certain construction and arrangement of the spokes; and Figs. 4 and 5 are longitudinal views of two constructions of spokes used in the wheel.

Similar letters refer to similar parts throughout the several views.

A is the rim of the wheel, and B its axle-sleeve. C D are the wire spokes, which are set staggering—that is, inclining alternately in opposite directions on opposite sides of the wheel. The hub portion of the wheel is composed in part of the sleeve B and in part of two side boxes mounted on the sleeve, and each consisting of two dished flanges, E E', presenting concave interiors to make room for the crossing of the spokes or certain of them, and to provide for holding a soft-metal filling, *b*, between the spokes within each pair of flanges. The side boxes formed by these flanges and filling are braced and held at suitable distances apart by a series of bolts, *c c*, and nuts *d d*. This forms a very substantial construction of the hub and secure hold for the spokes. Arranged concentrally between the hub and rim of the wheel, on each side of it, is a series of two, three, or more wires, G G, placed at suitable distances apart and interwoven with the spokes, each of said wires on each side of the wheel passing alternately or successively on the inside and outside of the spokes which are on the same side of the wheel, and being made fast at their ends to one of the spokes. Each successive wire G of the woven series of wires passes alternately on the outside and inside of the same spoke on the same side of the wheel, this varying the warp and weft construction of the wheel as formed by the spokes and wires G. Furthermore, the series of wires G on each side of the wheel are united with each other and with the spokes by separate short tie-wires, H, one to each spoke and arranged to diagonally connect the wires G of each series from opposite sides of the spoke, as shown in Fig. 1. This woven construction of the wheel gives great strength and elasticity to it, and the same essentially differs from a mere arrangement of one or more arches or rims of metal forming supplementary hubs between the central hub and felly of a wheel having its spokes arranged to rest upon opposite sides of said arches or rims and fastened thereto by clips. The spokes have their support against the rim A of the wheel by collars *e* near the outer ends of the spokes, the extreme outer ends of which enter the rim and may be secured therein. The spokes C are arranged to run across the whole diameter of the wheel, being made with a crook, *f*, at their center to hug or pass and partly encircle the sleeve B, and they may be flattened at such part to facilitate their crossing one another. This construction of the spokes (which might, if desired, be extended to all of them, but is only considered necessary to be applied to two or three of them) secures a stable support of the rim A without straining on the soft-metal filling *b*, which locks the spokes in the hub portion of the wheel. The remaining spokes D, which form single spokes as the others, C, form double ones, only extend from the rim A to or near the sleeve B, and are made of dovetail shape at their inner ends to interlock with the soft-metal filling $b$ of the hub portion of the wheel.

What I claim, and desire to secure by Letters Patent of the United States, is—

1. In combination with the axle-sleeve B and rim A of the wheel, the spokes C, arranged to extend diametrically across the wheel and constructed with crooks $f$, arranged to hug or partly encircle and pass said sleeve, substantially as specified.

2. The combination, on each side of the wheel, of the wire spokes C, crooked centrally of their length and arranged to extend wholly across the wheel, and the single spokes D, arranged to extend only from the hub to the rim of the wheel, essentially as described.

3. In combination with the wire spokes of the wheel, the series of concentrically-arranged wires G between the hub and rim of the wheel, on both sides of the latter, said wires being interwoven with the spokes as warp and weft, substantially as herein shown and described.

4. The tie-wires H, in combination with the spokes C D and series of wires G interwoven with the spokes on both sides of the wheel, essentially as described.

5. The hub of the wheel composed of an axle-sleeve, B, boxes formed of duplicate flanges E E', a soft-metal filling, $b$, and tie-bolts $c\ c$, with their nuts $d\ d$, substantially as specified.

6. The combination of the centrally-crooked double spokes C, and single spokes D, of dovetail shape at their inner ends, with the soft-metal filling $b$ of the dished boxes formed by the flanges E E', essentially as shown and described.

AARON VREELAND.

Witnesses:
FRANK C. WILLCOX,
JOHN C. TUNBRIDGE.